United States Patent [19]

Gaiser et al.

[11] 4,412,806
[45] Nov. 1, 1983

[54] PARISON EJECTOR FOR AN INJECTION MOLDING APPARATUS

[75] Inventors: William R. Gaiser; James Niepoky, both of Dayton, Ohio

[73] Assignee: The Broadway Companies, Inc., Dayton, Ohio

[21] Appl. No.: 263,946

[22] Filed: May 15, 1981

[51] Int. Cl.³ ............................................. A23P 1/00
[52] U.S. Cl. ............................ 425/554; 264/334; 425/525; 425/533; 425/537; 425/556
[58] Field of Search ............... 425/556, 554, 537, 525, 425/533, 537; 264/334, 336

[56] References Cited

U.S. PATENT DOCUMENTS

| Re. 25,290 | 12/1962 | Parafrey | 264/334 |
|---|---|---|---|
| 1,243,318 | 10/1917 | McLaren | 264/334 |
| 1,916,798 | 7/1933 | Hottel | 264/334 |
| 1,919,534 | 7/1933 | Shaw | 264/334 |
| 2,330,762 | 9/1943 | Tooker | 264/334 |
| 2,366,475 | 1/1945 | Bartholomew | 264/334 |
| 2,940,120 | 6/1980 | Grebowiec | 425/533 |
| 3,865,529 | 2/1975 | Guzzo | 425/556 |
| 4,133,627 | 1/1979 | Kontz | 425/525 |
| 4,181,698 | 1/1980 | Hayes et al. | 264/334 |
| 4,197,073 | 4/1980 | Rees et al. | 425/533 |
| 4,209,290 | 6/1980 | Rees et al. | 425/533 |

FOREIGN PATENT DOCUMENTS

763118  9/1980  U.S.S.R. ............................ 425/556

Primary Examiner—Jay H. Woo
Attorney, Agent, or Firm—Biebel, French & Nauman

[57] ABSTRACT

A parison ejector is used in combination with an injection molding apparatus of the type for molding parisons having an injector portion including a plurality of mold cavities communicating with a source of molten plastic material, an ejector portion for engaging the injector portion which includes a movable platen, a plurality of cores shaped and positioned to matingly engage the mold cavities, and an ejector frame which is carried by the movable platen and supports the cores. The parison ejector includes a hydraulic ram which actuates an ejector carriage which carries a pair of jaws pivotally mounted on the carriage and having mating ends which meet to form bearing surfaces which receive cams mounted in the ejector frame. The ends of the jaws form a portion of the mold and the parison is partly formed within it. Reciprocal movement of the ejector carriage with respect to the ejector frame causes the bearing race to move relative to the stationary cam thereby forcing the jaws apart so that the molded parison is removed from the end of the core. The cores preferably are hollow and include a helical pathway for a coolant to flow therethrough.

26 Claims, 8 Drawing Figures

FIG-1

PARISON EJECTOR FOR AN INJECTION MOLDING APPARATUS

BACKGROUND OF THE INVENTION

1. Field of the Invention

This invention relates to injection molding machines and, more particularly, to apparatus for ejecting parisons from the ejector portion of the molding apparatus.

2. Prior Art

Injection molding machines are widely used for the rapid and repeated molding of articles from thermoplastic materials such as polyethylene, polypropylene, polyethylene terephthalate, and polyvinylchloride. One type of injection molding machine is used to form parisons or preforms which are to be placed in blow molding machines to form carbonated beverage containers. The typical parison has a hollow tubular body, a threaded neck defining an open end, and an annular flange adjacent the neck.

In such applications, polyethylene terephthalate is the preferred material. This type of injection molding machine typically includes an injector portion in which a molten thermoplastic material is injected into a mold cavity to form the parison, and an ejector portion which withdraws the solidified molded parison from the cavity and ejects it into a catcher or other suitable receptacle.

The injector portion of the machine typically includes a hopper for receiving beads of a selected thermoplastic material which communicates with a reciprocating helical screw mounted within a heated casing. The screw conveys the beads of thermoplastic material along the heated casing during which time the beads are heated and compressed to become a molten liquid mass. The casing necks down to an orifice in a fixed platen which communicates with a manifold, and reciprocation of the screw projects a charge of the material into the manifold. The manifold receives the molten plastic material from the orifice into a sprue and conveys it through a series of runners to a plurality of gates. Each gate communicates with a mold cavity and the plastic material flows into the mold cavity to form the parison.

The ejector portion of the injection molding machine typically includes a plurality of cores shaped to fit into the cavities and about which the molded parisons are formed. The cores are mounted on a base plate which is supported by a clamp plate attached to the movable platen so that the cores are capable of reciprocating movement into and out of the mold cavities. The movable platen is actuated by a primary double-acting hydraulic cylinder and is guided by a plurality of guide rods which extend from a fixed base in the ejector portion to the fixed platen on the injector portion which supports the mold cavity and manifold.

The rod of the primary cylinder has a recess within which is mounted a secondary or ejector cylinder. The ejector cylinder is a double-acting hydraulic cylinder that includes an actuator rod which extends through the movable platen into the frame to activate the ejector mechanism.

The ejector mechanism typically includes a stripper plate which reciprocates within the frame and consists of a plurality of slide bars extending transversely across the platen on either side of the cores. The slide bars have pairs of cams extending from their ends which engage cam slots formed in cam plates mounted on either side of the base plate and extending from the movable platen toward the fixed platen. The cam slots are parallel but diverge adjacent the fixed platen. The slide bars carry pairs of jaws or thread splits which enclose the cores. The reciprocating movement of the stripper plate by the ejector cylinder causes the jaws to alternately open and close about the core as the slide bars are brought away from and toward the cores and each other by the engagement of the cams with their cam slots.

During the injection molding process the movable platen is advanced until the cores are positioned within the mold cavities and the upper and lower members of the jaws are closed about the core forming a sealed chamber within which the parison is formed. Typically, the jaws have an interior surface part of which is shaped to form the threads on the neck of the parison. The reciprocating ram injects molten plastic material into the mold manifold and it travels through the runners to the individual mold cavities. The molten plastic material flows about the portions of the cores within the mold cavities and in between the upper and lower members of the jaws to form the parison. The mold cavity is cooled by a recirculating water system and after the injection process ceases the mold begins to cool.

After the molten plastic has cooled sufficiently so that the parison has solidified and become dimensionally stable, the movable platen is retracted away from the injector portion of the machine by the primary cylinder thereby removing the cores from the mold cavities. At this time, the parisons are carried on the ends of the cores and the threaded necks of the parisons are still in between the jaws.

At the start of the ejection step, the stripper plate is urged forward by the ejector cylinder and the jaws are spread apart by the action of the cams within the divergent cam slots. By the time the parison bodies have been removed from the ends of the cores, the jaws have been spread apart so that the threaded portion of the parisons no longer is tightly clasped by the jaws. The parisons then fall by gravity into an appropriate receptacle.

There are many disadvantages inherent in the type of injection molding machine previously described. Principally, such injection molding machines require ejector portions having many components requiring high dimensional tolerances which add to the cost of the apparatus. In addition, the design of the ejector portion prevents close spacing of the cores and hence the mold cavities. This reduces the number of parisons produced per injection cycle and thus limits the production capacity of the injection molding machine.

Accordingly, there is a need for a simplified parison ejector apparatus with lesser dimensional tolerance requirements and permiting a greater number of cores to be mounted on the movable platen so that a greater number of mold cavities can be employed, thereby increasing the production rate of a given injection molding machine. In addition, it is desirable to make such an apparatus capable of being retrofitted onto existing injection molding machines.

SUMMARY OF THE INVENTION

The present invention provides an improved parison ejector apparatus for use in injection molding machines which eliminates the need for side mounted cam plates with divergent cam slots to move the jaws enclosing the core apart. Rather, the parison ejector apparatus incorporates a collet to hold the jaws of the ejector apparatus together. This arrangement eliminates the need for many of the precision components of prior art ejectors which are expensive to fabricate.

In addition, the ejector apparatus of the present invention is more compact, thereby allowing closer spacing of the individual cores of the ejector portion and permitting a greater number of mold cavities to be used in the injector portion of the injection molding machine. Thus, the present invention increases the parison production rate of a given injection molding apparatus by allowing a greater number of mold cavities to be mounted on the fixed platen. It is understood that, although the invention is described as being used for the fabrication of flanged parisons having threaded necks, it may be used to fabricate any form of substantially tubular parison for subsequent blow-molding having an elongated body. Thus, the term "parison" as used herein shall apply to all such forms.

The present invention also acts to decrease the cycle time of the injection molding machine in that it promises the rapid cooling of the interiors of the parisons being formed. In a preferred embodiment of the invention, the parison ejector apparatus includes a core having a hollow center in which is mounted a ribbon having a helical twist, thereby creating a passageway which is folded over on itself and has a helical path from the base to the tip of the core. Coolant which is pumped into the base of the core flows along this helical path toward the tip of the core and back again to provide even cooling along the length of the core.

The parison ejector apparatus of the present invention comprises an improved ejection means which includes a frame mounted to the clamp plate that includes an upper plate which receives a plurality of collets. Each collet fits about a pair of jaws having flared ends and has a frusto-conical shaped interior surface which acts as a bearing surface to urge the individual jaw members together about the core. The upper plate of the parison ejector apparatus is mounted on a spacer plate which includes dowel pins that extend into the upper plate opening through which the core and jaws extend. The spacer plate is mounted on the clamp plate by a frame of side rails.

The jaw members have opposing longitudinal edges which define bearing surfaces with converging portions located at the lower portion of the jaws opposite the flared ends. The bearing surfaces are spaced apart to receive the dowel pins therebetween. The lower portion of each jaw includes a divergent end which curves outward away from the core, and the divergent end of each jaw defines a notch about which the jaw pivots.

The divergent ends of the jaws are positioned within recesses formed in an ejector carriage which reciprocates within the ejector apparatus. Each of the recesses within which the jaws are positioned includes an opening through which the cores pass. The ejector carriage includes a pair of rods which extend along the length of the carriage and are positioned to fit within the notches of the individual jaw members so that the jaw members may pivot about the rods. A single ejector carriage may service, for example, six cores and pairs of jaws. A movable piston may carry four carriages mounted parallel to each other.

Each ejector carriage is displaced by an ejector pin which extends between the carriage and an actuator plate. The actuator plate receives the actuator rod of the ejector cylinder. Thus, the single actuator rod moves all of the ejector carriages.

The parison ejector apparatus is activated after the parisons have been molded within the mold cavities of the injector parison of the molding machine. When the parisons have cooled sufficiently to become dimensionally stable, the movable platen of the ejector portion is retracted away from the injector portion thereby removing the cores from the interiors of their respective mold cavities. The necks of the parisons, which are threaded, engage the ends of the jaws so that the parisons are retained on the ends of the cores as they are retracted.

At this time, the ejector cylinder within the larger cylinder rod is activated, the actuator rod is urged forward, and the ejector carriages are moved toward the upper plate of the ejector portion. This movement causes the opposing bearing surfaces of the jaw members to slidably engage the dowel pins mounted within the spacer plate. When the dowel pins engage the converging portions of the cam slots, the jaw members are forced to split apart and pivot about the rods mounted within the carriage which disengages the flared ends from the threaded necks of the parisons. Thus, movement of the carriages causes the flared ends of the jaws to move outward away from the collets and at the same time move the parisons toward the tips of the cores so that the pivoting of the jaws about the rods occurs at a time when the parisons are no longer superimposed on the cores.

The parisons then drop below the ejector frame into a suitable receptacle. After the ejecting shape of the mold cycle is completed, the ejector cylinder is activated to cause the actuator rod to draw the carriages away from the upper plate so that the cam surfaces slide against the dowel pins toward the flared ends of the jaws. When the carriage plates have been fully retracted, the flared ends of the jaws once again engage the interior surfaces of the collets and are thereby held together with a force sufficient to prevent molten plastic from flowing through the cam surfaces adjacent the flared ends.

In order to promote the rapid cooling of a parison, a preferred embodiment of the parison ejector apparatus of the present invention includes a core having a hollow center. A ribbon, preferably made of nylon, is twisted to form a helical shape and is inserted into the hollow center. The core communicates with a source of coolant at its base so that the coolant flows in a helical path from the base to the tip of the core and back, whereupon it exits the core and returns to the coolant source. The helical path of the coolant insures that there is no relatively hot side or relatively cool side to the portion of the core which engages the parison, thereby promoting uniform cooling of the parison body.

Accordingly, it is an object of the present invention to provide a parison ejector apparatus made up of components which do not require high dimensional tolerances or precise machining; to provide a parison ejector apparatus which permits a greater number of cores to be carried by the movable platen of an injection molding machine thereby permitting greater output of parisons per operational cycle; and to provide a parison ejector apparatus which promotes the rapid cooling of the interior of a parison and thereby reduces the overall cycle time.

These and other objects and advantages of the invention will be apparent from the following description, the accompanying drawings, and the appended claims.

DETAILED DESCRIPTION OF THE PREFERRED EMBODIMENT

Figure 1:
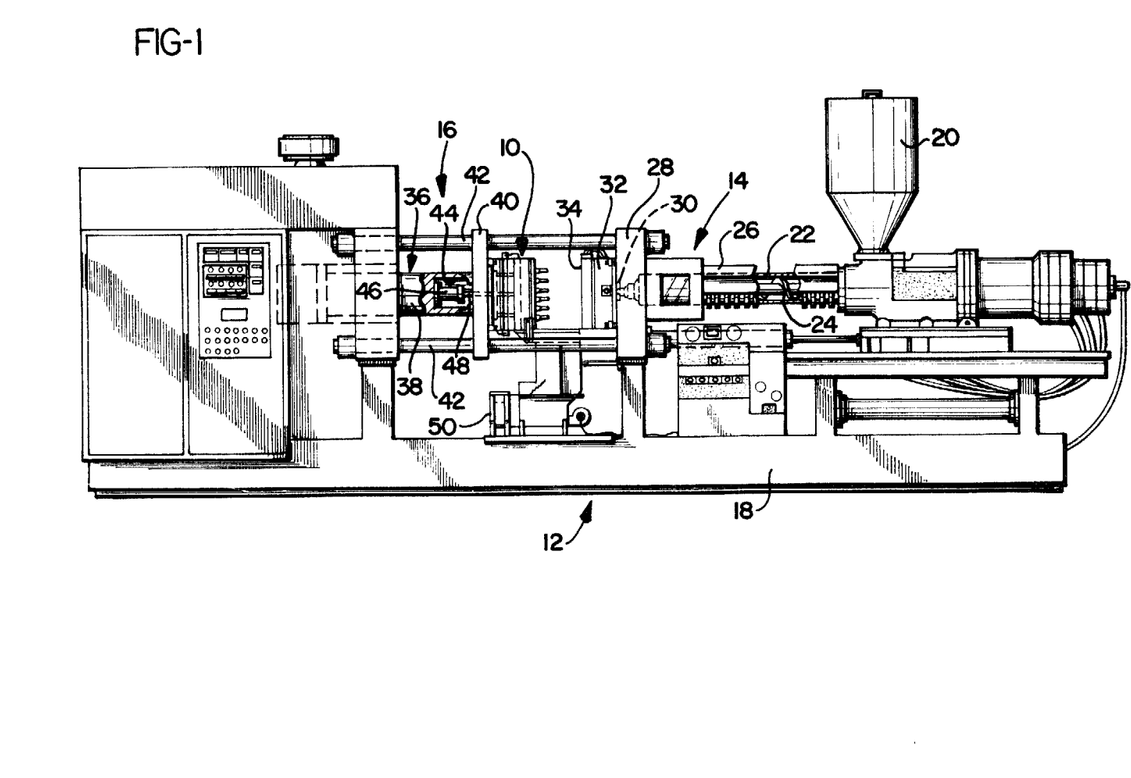
FIG. 1 is a side elevation of an injection molding machine incorporating the ejector apparatus of the present invention.

As shown in FIG. 1, the parison ejector apparatus of the present invention, generally designated 10, is adapted to be mounted within a typical injection molding machine, generally designated 12. The injection molding machine 12 includes an injector portion 14 and an ejector portion 16 mounted on a base 18. The injector portion 14 consists of a hopper 20 which opens into a hydraulically operated ram screw assembly 22 that includes a helical screw 24 mounted within a heated sleeve 26. The heated sleeve extends along the hydraulic ram screw assembly 22 to a fixed platen 28. The fixed platen 28 includes an orifice 30 which communicates with the heated sleeve 26 and a mold manifold 32 which is mounted on the fixed platen 28. The mold manifold 32 has a plurality of passages (not shown) which extend from a orifice 30 to a plurality of mold cavities within a mold cavity module 34.

The ejector portion 16 of the injection molding machine 12 includes a primary hydraulic ram 36 which includes a large rod 38 which is mounted to a movable platen 40. The movable platen 40 slidably engages guide rods 42 which extend from the ejector portion 16 to the fixed platen 28 of the injector portion 14. The design of the hydraulic ram 36, large rod 38, movable platen 40, and guide rods 42 are all well known in the art.

The large rod 38 of the hydraulic ram 36 includes a recess 44 within which is mounted a double-acting hydraulically actuated ejector cylinder 46. An actuator rod 48 extends outwardly from the ejector cylinder 46 through the movable platen 40 and into the parison ejector apparatus 10 in a manner well known in the art. The parison ejector apparatus 10 is mounted on the movable platen 40 above a parison catcher 50.

Figure 2:
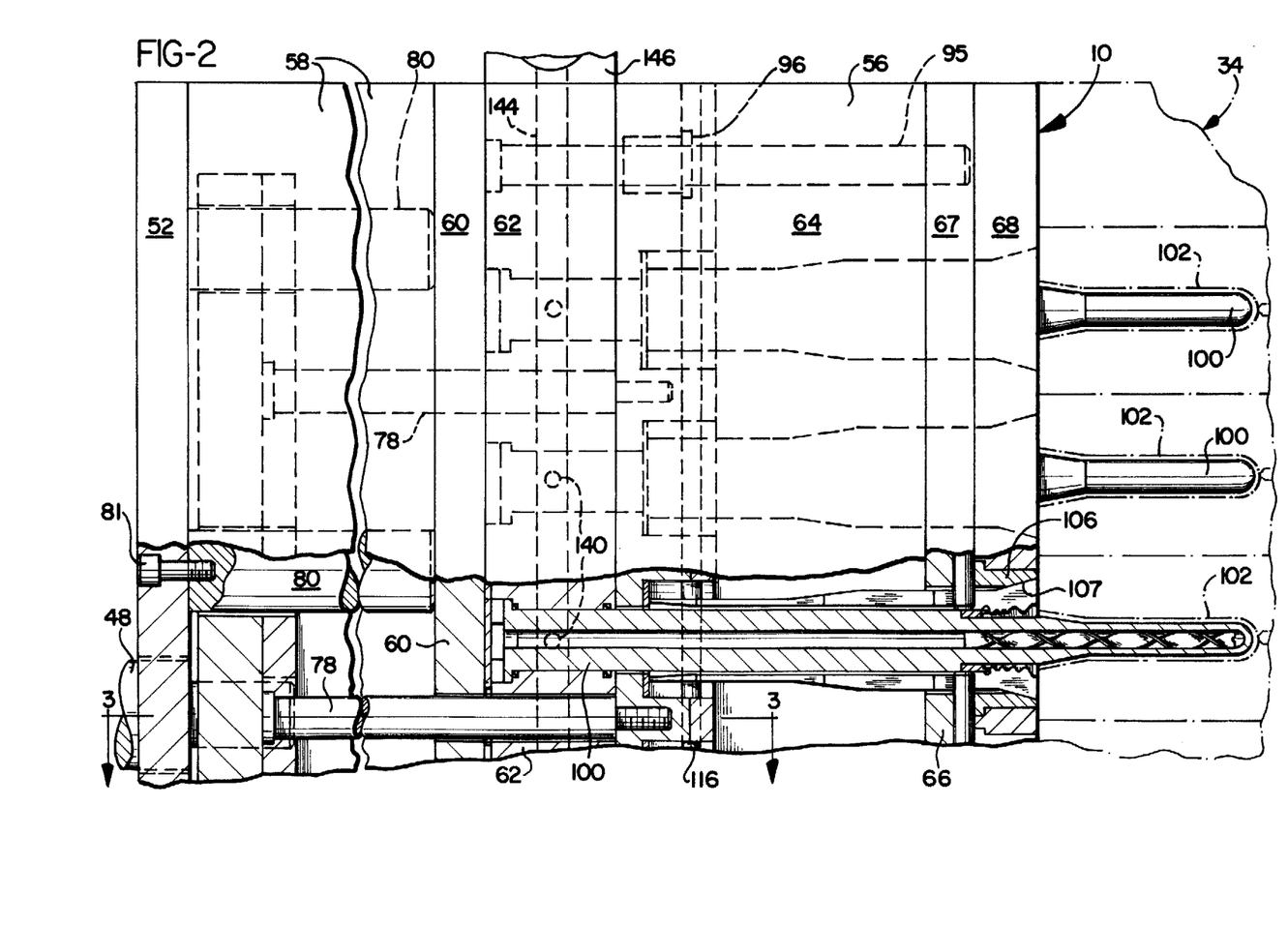
FIG. 2 is a fragmentary side elevation of the ejector apparatus of the present invention, partially broken away to reveal a core in section.
Figure 3:
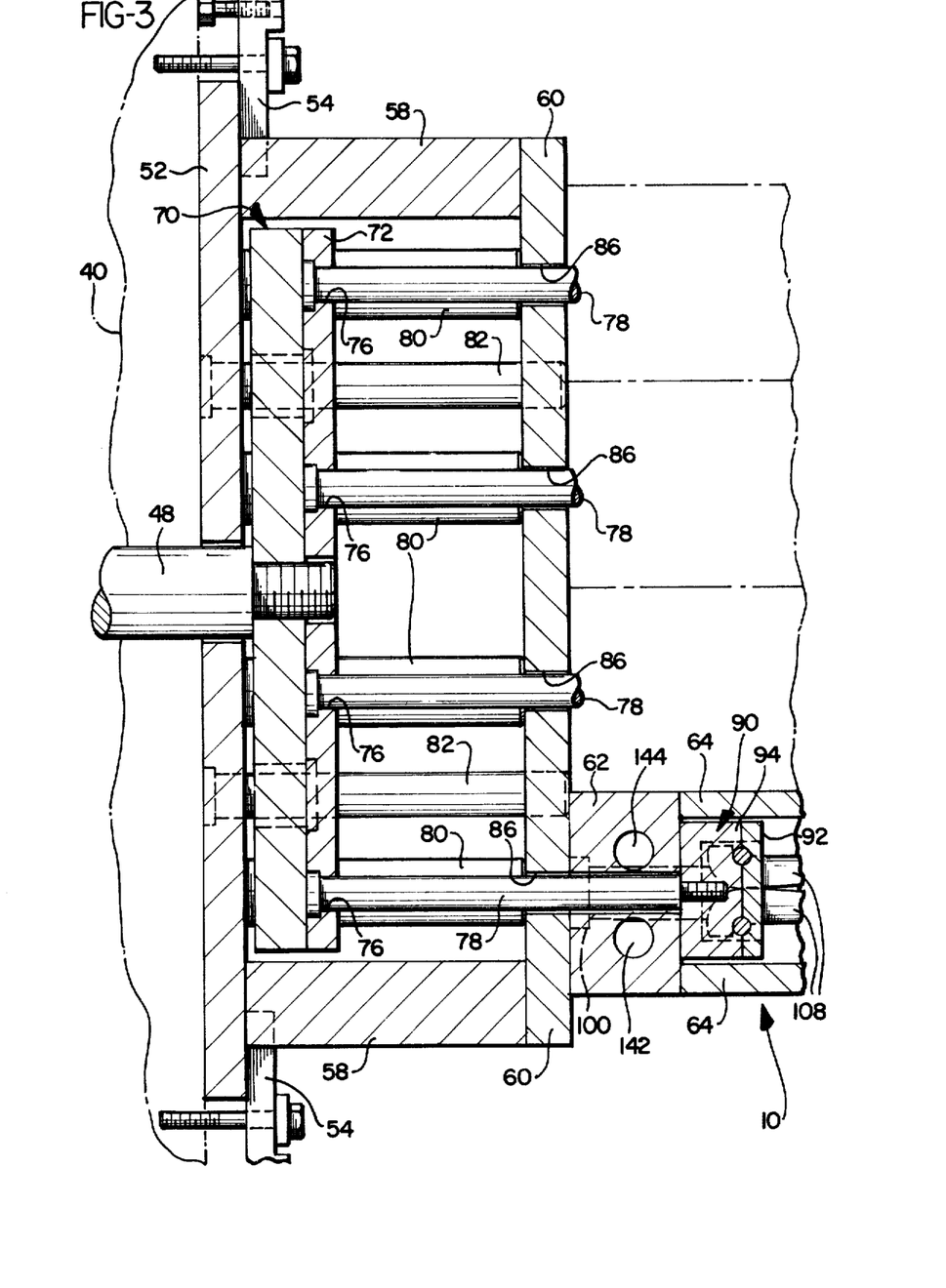
FIG. 3 is a fragmentary plan view of the ejector apparatus showing the actuator plate in section and ejector pins, taken at line 3—3 of FIG. 2.

As best shown in FIGS. 2 and 3, the ejector apparatus 10 is mounted on a clamp plate 52 which is held against the movable platen 40 by well known means such as clamps 54. The ejector apparatus 10 includes a frame 56 which is mounted on the clamp plate 52 at a rear portion. The frame 56 consists of primary side rails 58 which support a wall 60 which, in turn, supports a plurality of coolant channels 62 mounted in parallel relationship to each other. The primary side rails 58 are mounted to the clamp plate 52 by a well known means such as bolts and pins (not shown).

The coolant channels 62 are held to the wall 60 in similar fashion by bolts (not shown) and pins 63. The coolant channels 62 support a plurality of secondary side rails 64 by bolts 65 and pins 66. Spacer plate 67 and upper plate 68 are supported by secondary side rails 64 and held by bolts 69 (shown in FIG. 5).

Within the space defined by the clamp plate 52, primary side rails 58, and wall 60 is positioned an actuator plate 70. The actuator plate 70 consists of an upper actuator member 72 and lower actuator member 74. The actuator rod 48, which extends from the ejector cylinder 46 (shown in FIG. 1), is threaded into the lower actuator plate 74. The lower actuator plate 74 and upper actuator plate 72 are clamped together by bolts (not shown) and the upper actuator member contains countersunk holes 76 which receive ejector pins 78.

The actuator plate 70 may also contain holes (not shown) which allow support pillars 80 and guide pins 82 to pass through. The support pillars 80 extend between the wall 60 to provide structural support between the two members. The guide pins 82 are used to guide the travel of the actuator plate 70 as it reciprocates between the clamp plate 52 and wall 60. The support pillars 80 may be secured to the clamp plate 52 by means such as bolts 84. The guide pins 82 may be secured to the clamp plate 52 by similar means (not shown) or merely held in countersunk holes and sandwiched between the clamp plate and the movable platen 40.

The wall 60 defines a plurality of openings 86 through which pass the ejector pins 78. The ejector pins 78 also pass through openings 88 in the coolant channels 62 and are threaded into ejector carriages 90. Each ejector carriage 90 consists of an upper ejector plate 92 and a lower ejector plate 94. The ejector carriage 90 is said to reciprocate within the space between the coolant channel 62 and the spacer plate 67. Carriage guide pins 95 are mounted within the coolant channel 62 and extend into spacer plate 67. The carriage 90 includes collars 96 which fit about and engage the pins 95 so that the travel of the carriage is controlled and limited to linear motion.

Figure 4:
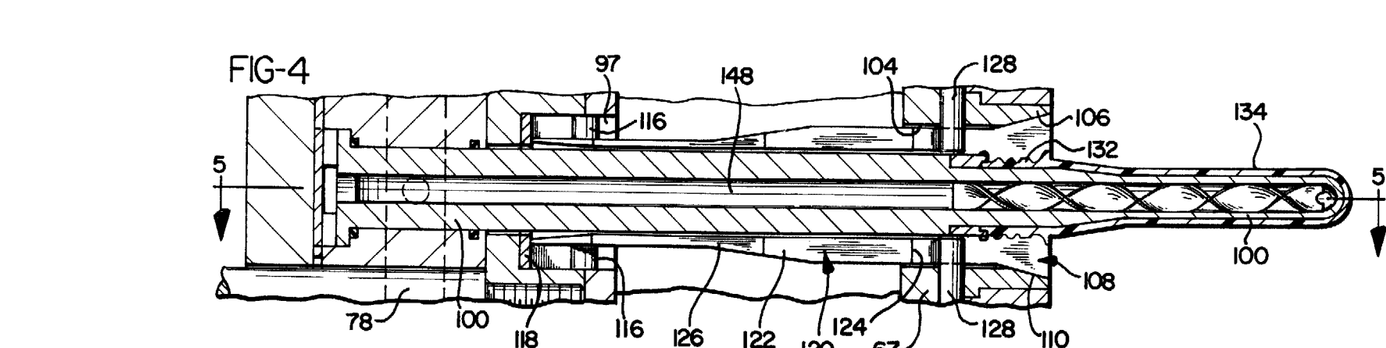
FIG. 4 is a side elevation in section of a core of the ejector apparatus.
Figure 5:
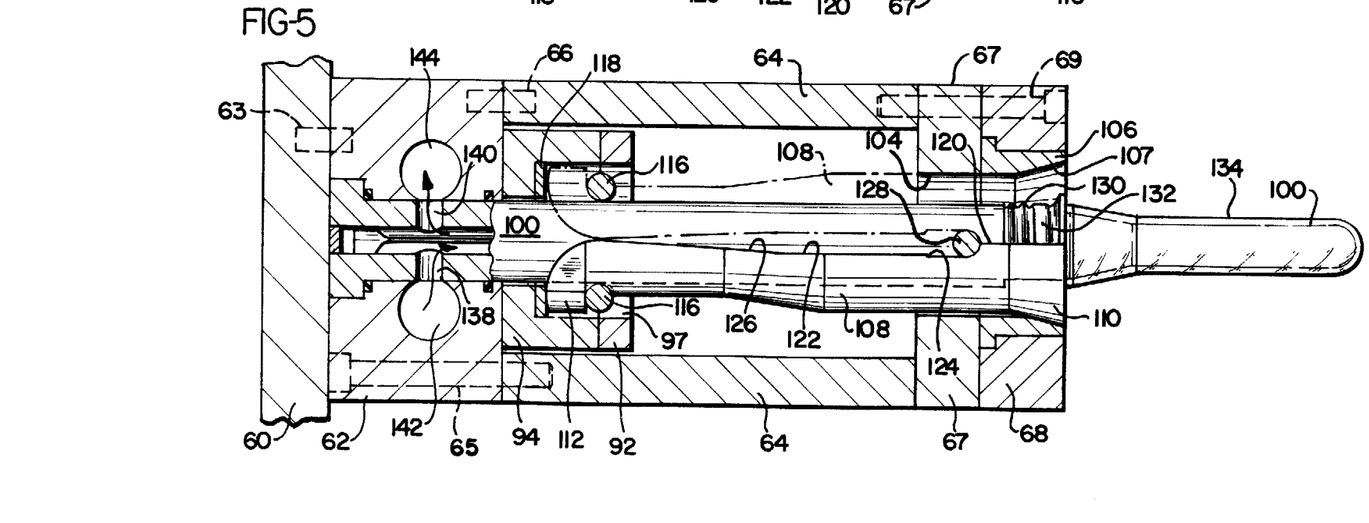
FIG. 5 is a side elevation in section of the ejector apparatus taken at line 5—5 of FIG. 4 with the core partially broken away to show the inlet and outlet of the core.

As best shown in FIGS. 4 and 5, each ejector carriage 90 contains recesses 97 concentric with core openings 98. Cores 100 are mounted within the coolant channels 62 and extend outward toward the ejector portion 16 and into the individual mold cavities 102, shown schematically in FIG. 2. Each core passes through an upper opening 104 formed in the spacer plate 66 and upper plate 68. A collet 106, having a frusto-conical interior surface 107, is mounted within the upper plate 68 and is positioned about the core 100 in upper opening 104.

Each of the cores 100 is enclosed by a pair of opposing jaws 108 which extend from a recess 96 in the ejector carriage 90 to the collet 106 within the upper plate 68. The jaws 108 are generally cylindrical in shape and have flared upper ends 110 and divergent lower ends 112 which define notches 114. The notches 114 are sized to fit about retaining rods 116 which extend along the length of the ejector carriage 90 and are clamped into place between the upper ejector plate 92 and the lower ejector plate 94. In this fashion, the jaws 108 may pivot about the retaining rods 116 so that the flared ends 110 move away from the core 100. The recess 96 within the ejector carriage 90 may include a washer 118 made of a friction reducing material such as teflon to aid in the movement of the divergent lower ends 112 within the recess.

The jaws 108 include mating longitudinal edges 120 which define bearing surfaces 122. The bearing surfaces 122 include a shoulder 124 and a converging portion 126.

The bearing surfaces 122 of the jaws 108 are spaced apart to accommodate dowel pins 128 which are fitted into the spacer plate 67 extend into the upper opening 104 and are clamped into position between the upper plate 68 and spacer plate 66. Thus, as the ejector carriage 90 is displaced from the coolant channel 62 toward the spacer plate 66, the dowel pins 128 slidably engage the bearing surfaces 122 of the jaws 108.

Each jaw member 108 has an interior surface that is semi-cylindrical in shape. The flared upper end 110 has an inner surface which defines a portion of a helical thread path 130. The helical thread path forms the threaded neck 132 of a parison 134 which is formed on the end of the core 100.

In order to increase the cooling rate of the parison 134, the core 100 of the preferred embodiment includes a cooling means which is best shown in FIGS. 2, 4, and 5. The core 100, which is mounted within the coolant channel 62, has a hollow center portion 136 extending from the base of the core to the tip. The hollow center portion 136 includes an inlet 138 and outlet 140 to permit the ingress and egress of coolant fluid. The inlet 138 and outlet 140 of the core communicate with conduits 142, 144 respectively which convey coolant to and from the cores and a manifold 146 of conventional design which is mounted transversely across the coolant channels, shown partially in FIG. 2.

Within the hollow center portion 136 of each core 100 is mounted a ribbon-shaped insert 148 having a twisted, helical shaped end portion 150 and a plug portion 151. The hollow center portion 136 is sealed at the base of the core by the plug 151 and by means of a gasket 152 of conventional design. In this fashion, the hollow center portion 136 is provided with a single pathway that is convoluted at the upper end of the core so that coolant flowing through the core defines a spiral path at the portion adjacent the parison 134. In this fashion, there is no hot side or cold side of the core, a condition that would result if the coolant followed a straight path folded over on itself and was gradually heated as it flowed adjacent the parison. The insert 148 is preferably made of a hard nylon material having sufficient resiliency to form a substantially fluid-tight seal between its edge and the surface defining the hollow center portion 136.

The operation of the parison ejector apparatus 10 is as follows: During the injection portion of the operation cycle, the injector portion 14 and ejector portion 16 are abutting one another as shown somewhat schematically in FIG. 2. At this time, granulated thermoplastic material is deposited into the hopper 20 and flows downwardly into the heated sleeve 26 where it is heated, compressed, and urged forward by the helical screw 24 to the orifice 30 in the fixed platen 28. At the orifice 30, the now molten plastic material enters the mold manifold 32 where it is distributed to the individual mold cavities 102 of the mold cavity module 34. The molten material flows into the mold cavities 102 and about the cores 104 to form the parison 134. In addition, the molten material flows in between the flared upper ends of the jaws where it engages the helical thread path 130 formed on the interior surface of the flared end.

When the mold cavity 102 and flared portion 110 have become filled with molten thermoplastic material, the flow of thermoplastic material is stopped and the material begins to cool down and solidify. This cooling action is accelerated by the cooled core 100 of the ejector portion 16 which includes the helical insert 138 which provides a core having an evenly cooled surface.

After the parison 134 has cooled sufficiently to become dimensionally stable, the primary hydraulic ram 36 is activated to retract the movable platen 40 away from the fixed platen 28 until it reaches a position shown in FIG. 1. At this time, the ejector cylinder 46 is activated thereby causing the actuator rod 48 to extend outwardly from the cylinder. The movement of the actuator rod 48 causes the actuator plate 70 to travel from its starting position adjacent the clamp plate 52 toward the wall 60. In travelling toward the wall 60, the actuator plate causes the ejector pins 78 to urge the ejector carriage 90 from their starting position adjacent the coolant channels 62 toward the spacer plate 66.

Figure 6A:
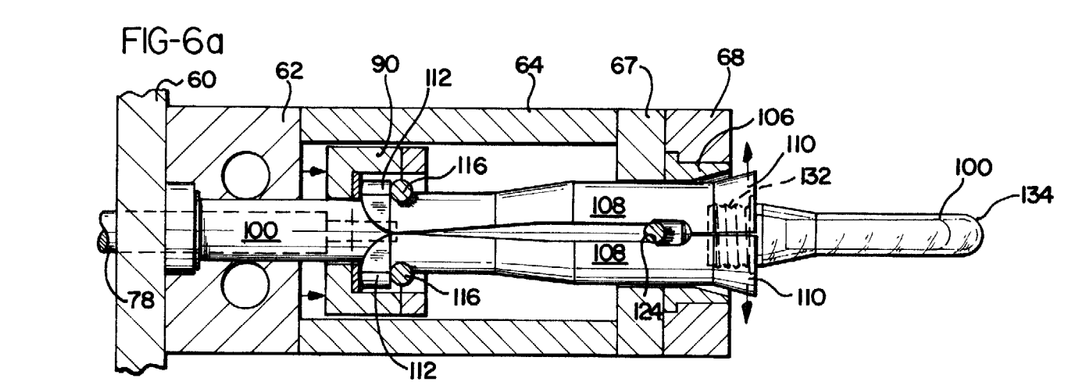
FIGS. 6a, 6b, and 6c are sequential plan views which depict the operation of the ejector apparatus of the present invention.
Figure 6B:
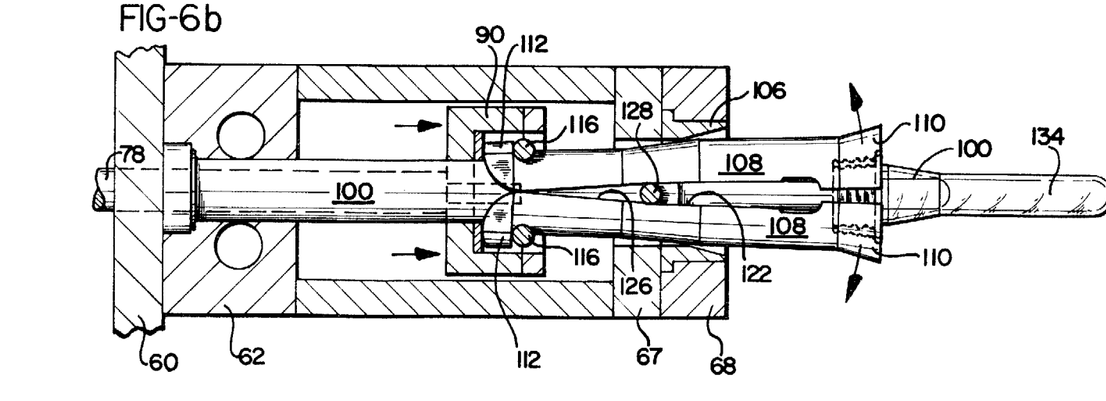
Figure 6C:
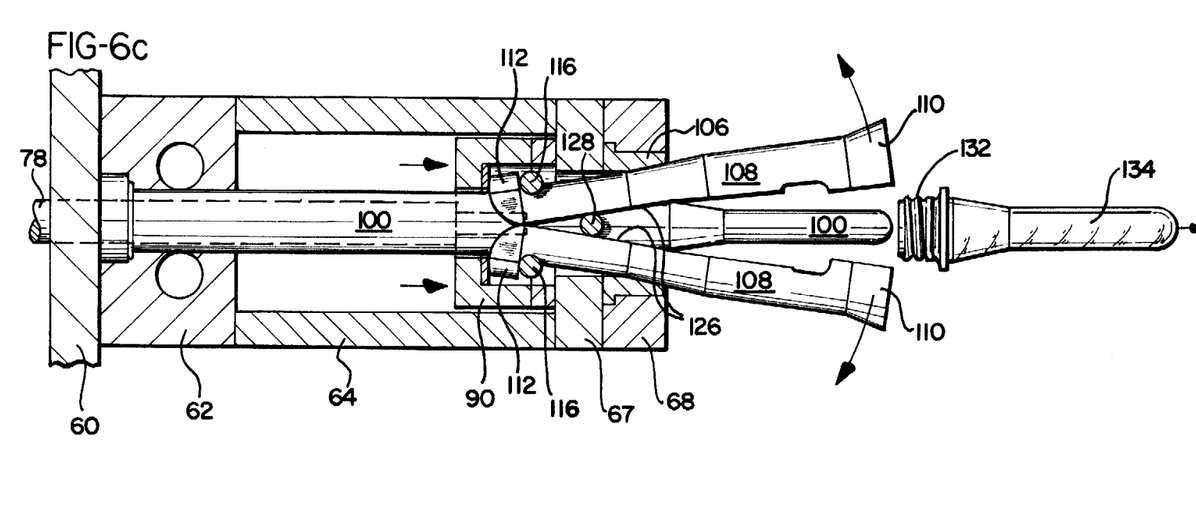

In a sequence that is best shown in FIGS. 6a, 6b, and 6c, as each ejector carriage 90 advances toward the spacer plate 67, the bearing surfaces 122 of the jaws 108 move relative to the dowel pins 128. As the dowel pins 128 engage the shoulders 124 of the bearing surfaces 122 (FIG. 6a), the jaws 108 are forced apart by the dowel pins thereby breaking the seal about the threaded neck 132 of the parison 134. The divergent lower ends 112 of the jaws 108 are forced to pivot about the retaining rods 116. At this stage in the ejection cycle, the flared ends 110 no longer engage the frusto-conical interior surface of the collet 106 since the jaws 108 are being displaced outward along the core 100. The movement of the ejector carriage 90 toward the spacer plate 66 causes the parison 134 to be displaced from its original position on the end of the core.

As shown in FIG. 6b, when the ejector carriage 90 has advanced sufficiently to place the dowel pin 128 in sliding engagement with the converging portion 126 of the bearing surfaces 122, the jaws 108 are split apart further and continue to pivot about the retaining rods 116. However, the jaws 108 are still sufficiently close together to cause the parison 134 to continue its motion off the end of the core 100. It should be noted that the exterior surfaces of the jaws 108 necks down toward the divergent lower ends 112 so that sufficient clearance between the exterior surface of the jaws 108 and the collets 106 is provided to permit the jaws to pivot about the retaining rods 116.

The final stage of the ejection process is shown in FIG. 6c. At this time, the actuator rod 48 has driven the actuator plate 70 to its most advanced position adjacent the wall 60. The ejector pins 78 have advanced the ejector carriages 90 to their most advanced positions adjacent the spacer plates 67. The interaction of the dowel pins 128 and the converging portions 126 of the bearing surfaces 122 has caused the jaws 108 to separate sufficiently to permit the threaded neck 132 of the molded parison 134 to disengage completely from the flared upper ends 110 of the jaws. The parison now has been displaced completely from the tip of the core 100 so that it may fall unhindered into the catcher 50 (FIG. 1).

While the form of apparatus herein described constitutes a preferred embodiment of this invention, it is to be understood that the invention is not limited to this precise form of apparatus, and that changes may be made therein without departing from the scope of the invention.

What is claimed is:

1. In an injection molding machine of the type having an injector portion including a mold cavity module having a plurality of mold cavities communicating with a source of molten plastic material, an improved ejector portion comprising:
   a platen mounted to said machine for reciprocating movement toward and away from said mold cavity module;
   a frame mounted to said platen and extending toward said mold cavity module;
   a plurality of cores mounted to said frame and extending toward said mold cavity module, said cores positioned to enter and withdraw from said mold cavities upon said reciprocating movement of said platen;
   carriage plate means slidably mounted to said frame for movement toward and away from said platen and including a plurality of bores through which pass said cores;
   a plurality of pairs of opposing jaws pivotally mounted to said carriage plate means, each of said pairs enclosing one of said cores and forming complementary portions of a parison mold;
   said pairs of jaws including mating longitudinal edges defining opposing bearing surfaces having a converging portion proximate said carriage plate means;
   cam means mounted to said frame and positioned between said opposing bearing surfaces; and
   means for reciprocating said carriage plate means relative to said frame and cores such that movement of said carriage plate means away from said platen in an ejection sequence causes said jaws to move relative to said cores thereby removing molded parisons therefrom and causes said bearing surfaces to slidably engage said cam means whereby said cam means forces said pairs of jaws apart upon encountering said converging portions thereof so that said jaws release molded parisons from said mold portions thereof.

2. The injection molding machine of claim 1 further comprising bearing means mounted to said carriage plate means and engaging each of said jaws such that said jaws pivot about said bearing means.

3. The injection molding machine of claim 2 wherein said bearing means comprises a pair of rods extending along said carriage plate means.

4. The injection molding machine of claim 3 wherein each of said jaws includes a lower portion terminating in a divergent end forming a transverse notch and positioned such that one of said rods extends transversely across said notch.

5. The injection molding machine of claim 1, 2, or 3 wherein each of said jaws includes an upper portion terminating in a flared end, and further comprising a plurality of collets having frusto-conical interior walls mounted to said frame and receiving said cores therethrough so that each of said flared ends is positioned to slidably engage one of said interior walls such that said pairs of opposing jaws are urged together to seal said complementary mold portions when said carriage plate means is drawn toward said platen by said reciprocating means.

6. The injection molding machine of claim 5 wherein said flared end of each of said jaws includes said complementary mold portion.

7. The injection molding machine of claim 1 wherein the improvement further comprises:
   said core having a wall and a tip at an upper end defining a hollow center portion therethrough, an inlet opening and an outlet opening communicating with said center portion;
   means for supplying coolant to said inlet opening and removing coolant from said outlet opening; and
   divider means extending along said center portion having lateral edges abutting said wall, at least a portion of said divider means having a helical shape such that a single channel is formed within said passage whereby coolant flowing into said inlet opening flows to said tip and from said tip to said outlet in a helical path.

8. The injection molding machine of claim 7 wherein said divider means comprises a ribbon-shaped insert having a plug portion to seal said center portion at an end.

9. The injection molding machine of claim 7 wherein said portion of said divider means having a helical shape in proximate said tip.

10. The injection molding machine of claim 9 wherein said inlet opening and said outlet opening are on opposite sides of said divider means.

11. The injection molding machine of claim 10 wherein said means for supplying and removing coolant comprises:
    an inlet conduit for conveying coolant from a source of coolant communicating with said inlet opening; and
    an outlet conduit for conveying coolant heated by said parison from said core communicating with said outlet.

12. The injection molding machine of claim 11 wherein the improvement further comprises a coolant channel which contains said inlet and outlet conduits, said coolant channel supporting said cores and forming a part of said frame.

13. For use in an injection molding apparatus, an improved core of the type having a substantially cylindrical body including a wall and a tip at an end, wherein the improvement comprises:
    said wall and said tip defining a hollow center portion therethrough and an inlet opening and an outlet opening communicating with said portion; and
    divider means extending along said portion having lateral edges abutting said wall, at least a portion of said divider having a helical shape such that a single channel is formed within said passage whereby coolant flowing into said inlet opening flows to said tip and from said tip to said outlet in a helical path.

14. The core of claim 13 wherein said divider means comprises a ribbon-shaped sheet.

15. The core of claim 13 wherein said portion of said divider means having a helical shape is proximate said tip.

16. For use with an injection molding machine for forming parisons of the type having an injector portion including a mold cavity module having a plurality of mold cavities communicating with a source of molten plastic material and an ejector portion for engaging said injector portion including a movable platen, a parison ejector apparatus comprising:
    a frame having a rear portion adapted to be mounted to a platen and having a plurality of cores mounted thereto and an upper plate having a plurality of openings through which said cores extend and adapted to abut a mold cavity module when an associated ejector portion engages an associated injector portion;

carriage plate means slidably mounted to said frame for reciprocal movement between said upper plate and said rear portion, said carriage plate including a plurality of transverse bores through which pass said cores;

pairs of opposing jaws enclosing each of said cores, each of said jaws pivotally mounted to said carriage plate means and formning a complementary portion of a parison mold;

said pairs of opposing jaws including mating longitudinal edges defining opposing bearing surfaces having converging portions proximate said carriage plate means;

cam means mounted in said upper plate and extending between said opposing bearing surfaces; and means for reciprocating said carriage plate means relative to said frame and said cores such that movement of said carriage plate means toward said upper plate in an ejection sequence causes said jaws to move along said cores thereby removing molded parisons therefrom and causes said bearing surfaces to slidably engage said cam means whereby said cam means forces said jaws to pivot away from each other upon encountering said converging portions such that a parison formed on said core may be urged off of said core and out of said complementary portions.

17. The apparatus of claim 16 wherein each of said pairs of opposing bearing surfaces includes opposing shoulders at an end opposite said converging portion such that engagement of said shoulders by said cam means during said ejection sequence causes said pairs of jaws to be forced apart sufficiently to break the seals about associated molded parisons but remain in engagement therewith such that parisons may be urged off of said cores by said reciprocal movement of said carriage plate means.

18. The parison ejector apparatus of claim 16 further comprising bearing means mounted to said carriage plate means and engaging each of said jaws such that said jaws pivot about said bearing means.

19. The parison ejector apparatus of claim 18 wherein said bearing means comprises a pair of rods extending along said carriage plate means.

20. The parison ejector apparatus of claim 19 wherein each of said jaws includes a lower portion terminating in a divergent end forming a transverse notch and positioned such that one of said rods extends transversely across said notch.

21. The parison ejector apparatus of claim 16 wherein each of said jaws includes an upper portion terminating in a flared end and said ejector apparatus further comprises a plurality of collets having frusto-conical interior walls mounted in said upper plate and defining said openings so that each of said flared ends is positioned to slidably engage one of said interior walls whereby said opposing jaws of each of said pairs of opposing jaws are urged together when said carriage plate means is drawn toward said rear portion of said frame by said reciprocating means thereby sealing said complementary mold portions.

22. The parison ejector apparatus of claim 21 wherein said flared end of each of said jaws includes said complementary mold portion.

23. The parison ejector apparatus of claim 16 further comprising:

each of said cores having a wall and a tip at an upper end defining a hollow longitudinal passage therethrough, an inlet opening and an outlet opening communicating with said passage;

means for supplying coolant to said inlet opening and removing coolant from said outlet opening; and a divider extending along said passage having lateral edges abutting said wall, at least a portion of said divider having a helical shape such that a single channel is formed within said passage whereby coolant flowing into said inlet opening flows to said tip and from said tip to said outlet in a helical path.

24. The parison ejector apparatus of claim 23 wherein said divider comprises a ribbon-shaped insert having a plug portion at an end, said portion of said insert having a helical shape is proximate said tip and said plug portion seals said center portion opposite said tip.

25. The parison ejector apparatus of claim 23 wherein said means for supplying and removing coolant comprises:

an inlet conduit for conveying coolant from a source of coolant communicating with said inlet opening, and an outlet conduit for conveying coolant heated by said parison from said core communicating with said outlet.

26. The parison ejector apparatus of claim 25 further comprising a coolant channel containing said inlet and outlet conduits and supporting said cores, said coolant channel forming a part of said frame.

* * * * *